3,192,107
FEED COMPOSITIONS CONTAINING PARA-AMINO-METHYL-BENZENE-SULFONAMIDE AND METHOD OF USING SAME

Clarence Walter Whitmoyer, James Ross Wiley, and Timothy Scott Chang, Myerstown, Pa., assignors, by mesne assignments, to Whitmoyer Laboratories, Inc., a corporation of Delaware
No Drawing. Filed Nov. 29, 1962, Ser. No. 241,030
Claims priority, application Great Britain, Dec. 12, 1961, 44,394/61
12 Claims. (Cl. 167—53)

This invention relates generally to feeding stuffs for animals and poultry, more specifically livestock such as pigs, chickens and turkeys; the invention relating more particularly to new feed composition containing a chemical compound having favorable growth-promoting characteristics and to a method of stimulating and accelerating the growth of such animals by administration of the chemical compound together with a basal diet which is nutritionally adequate per se for normal growth.

According to the present invention there is provided a feed composition which contains, as a growth-promoting agent, a compound having as its active ingredient para-amino-methyl-benzene-sulfonamide (which may also be named p-sulphamoyl-benzylamine). It has been found that when this compound is administered to animals as an additive to a basal ration or feed at certain levels within limited ranges of concentration that their growth will be stimulated and materially accelerated. It will be understood that the term "animals" as herein used is intended to mean such ordinary farmyard animals as pigs, chickens, turkeys and the like. The compound, which is herein referred to an additive, may be administered to the animals by incorporating it in the nutritionally adequate basal rations which, for present purposes, will be understood to be solid feed such as feed mash, grain mixtures, or other comminuted mixtures constituting basal feedstuffs, including also liquid feedstuff or the compound may be incorporated in drinking water supplied to the livestock along with the solid feed.

The use of para-amino-methyl-benzene-sulfonamide and its salts as an additive to the basal diet is particularly advantageous in the nutrition of pigs, chickens and turkeys, since they show material weight gains and increased efficiency of feed utilization when their normal basal diets are supplemented with a comparatively small percentage of this growth-promoting compound, it having been found that the incorporation of the compound in the feed in a concentration within the range of 0.005% and 0.5% is effective in promoting growth without toxic or other unwanted or undesirable side effects.

In practicing the invention, we prefer to use para-amino-methyl-benzene-sulfonamide in the form of the hydrochloride salt and to incorporate this in effective concentration in a solid feed, although other salts of para-amino-methyl-benzene-sulfonamide and the base itself have also been found to be effective in accelerating growth. The feed composition may be based on any conventional feed compounded in accordance with established principles for basal adequate diet for the particular animal or bird to which it is to be fed. The active ingredient is added to the feed in amounts within the limited range set forth above and may be administered to the animals by placing the feed before the animals to be available at all times for consumption ad libitum or it may be administered by controlled interrupted feeding, taking into account that the animal should not partake of more than the proportionate amount in its daily diet than is desirable for effective results. It is preferred to incorporate the active ingredient in an amount of about 0.025% when incorporated in solid feed since this leads to economy in the use of the active ingredient and ordinarily the results obtained are not significantly poorer than can be obtained when larger quantities of the additive are incorporated in the feed composition. Although in certain instances larger amounts in the diet than necessary for satisfactory growth promotion may be added without toxic effect, it will be understood that the amount of additive preferably to be incorporated in the diet will be largely governed by the rules of economy. In some instances it is found that somewhat better results may be obtained by incorporating a quantity of compatible vitamin preparation in the feed composition in addition to the active growth-promoting ingredient above referred to. Addition of the vitamin preparation is preferably made in the range of about 0.2% to 0.5%. Such vitamin preparation may be a multivitamin preparation of the type known and conventionally employed in animal feeding stuffs.

To illustrate the effects of para-amino-methyl-benzene-sulfonamide and the salts thereof as an active ingredient in animal feed rations for stimulating and increasing or accelerating growth there are described hereinafter various illustrative experiments or tests.

In one experiment the active ingredient in the form of the hydrochloride salt (para-amino-methyl-benzene-sulfonamide-hydrochloride) was tested at three levels, i.e., 0.1%, 0.05% and 0.025% of the basal diet fed to chicks, with a simultaneous, negative control group; that is, the diet of the control group did not contain any additive. The basal diet was a proprietary chick mash excluding any growth-promoting additives.

Two groups of ten male and ten female New Hampshire Rex X Light Sussex, day-old chicks were allocated at random to each of the treatments. Initial live weights were recorded initially and at 1, 2, 3, 4, 6, 8 and 10½ weeks of age. Group feed consumption was recorded throughout.

The birds were housed in experimental broiler pens on wood shavings and were brooded under infra-red lamps. Food and water was supplied ad libitum.

The average weight gains for each group are set out in Tables I and II. A summary of these tables is as follows:

Table I

| Group | Percentage active ingredient [1] | Average weight gain (grams) | | | |
|---|---|---|---|---|---|
| | | 1 wk. | 2 wks. | 3 wks. | 4 wks. |
| A | 0.1 | 28.5 | 86.8 | 182.1 | 289.6 |
| B | 0.05 | 29.9 | 87.2 | 181.0 | 291.4 |
| C | 0.025 | 27.1 | 82.1 | 176.6 | 283.4 |
| D (Control) | | 24.7 | 77.6 | 161.2 | 256.3 |

[1] Para-amino-methyl-benzene-sulfonamide-hydrochloride.

Table II

| Group | Percentage active ingredient [1] | Average weight gain (grams) | | |
|---|---|---|---|---|
| | | 6 wks. | 8 wks. | 10½ wks. |
| A | 0.1 | 558.6 | 1,015.6 | 1,412.1 |
| B | 0.05 | 545.7 | 976.7 | 1,412.1 |
| C | 0.025 | 539.4 | 985.3 | 1,446.9 |
| D (Control) | | 531.6 | 938.1 | 1,325.8 |

[1] Para-amino-methyl-benzene-sulfonamide-hydrochloride.

The tabulated results show that the active ingredient has provided a significant growth increase at all three levels of administration. The 0.025% level appears almost as beneficial as the higher levels, there being little consistent difference between the three treatments.

It was also found that there was an improvement in feed conversion as a result of the dietary additions.

In the following tables there are set forth in tabular form the results of other tests which were carried out with pigs, chickens, and turkeys with different salts of para-amino-methyl-benzene-sulfonamide and the base itself. In the following tables certain abbreviations are used for convenience. The abbreviation for the base (para-amino-methyl-benzene-sulfonamide) is PAMBS. Salts of this base are indicated by adding the name or abbreviation of the name of the salt, hence—PAMBS HCl—indicates the hydrochloride salt (para-amino-methyl-benzene-sulfonamide-hydrochloride).

In Tables III to V there are shown tests conducted with chickens, the additive compounded in the feed, the number of birds in the groups, average weight gain at particular ages, feed consumption per bird, and feed efficiency. It will be understood that the controls were fed only the basal ration without any additive. Feed efficiency refers to amount of feed consumed per unit weight gain; for example, pounds of feed per pound of weight gain. The feed in each test was a nutritionally adequate feed per se for normal growth.

*Table III*

CHICKENS (DAY-OLD CHICKS)

| Group | No. of birds | Average weight at 4-wk.-old (gm.) | Feed consumption (lb.) | Feed efficiency |
|---|---|---|---|---|
| 1. PAMBS HCl, 0.05% | 25 | 516 | 1.80 | 1.73 |
| 2. PAMBS HCl, 0.025% | 25 | 514 | 1.84 | 1.77 |
| 3. PAMBS HCl, 0.01% | 25 | 513 | 1.88 | 1.82 |
| 4. PAMBS HCl, 0.05% | 25 | 527 | 1.92 | 1.80 |
| 5. Vitamins | 25 | 509 | 1.86 | 1.81 |
| 6. Avita* | 25 | 490 | 1.83 | 1.86 |
| 7. Control | 25 | 471 | 1.78 | 1.88 |
| 8. PAMBS HCl, 0.05% and vitamins | 25 | 523 | 1.83 | 1.73 |
| 9. PAMBS HCl, 0.025% and vitamins | 25 | 542 | 1.91 | 1.74 |
| 10. PAMBS HCl, 0.01% and vitamins | 25 | 497 | 1.88 | 1.88 |
| 11. PAMBS HCl, 0.05% | 25 | 520 | 1.81 | 1.73 |
| 12. Vitamins | 25 | 492 | 1.83 | 1.85 |
| 13. Avita* | 25 | 499 | 1.89 | 1.88 |
| 14. Control | 25 | 478 | 1.80 | 1.88 |

*Avita: A proprietary antibiotic composition (0.4 lb./ton) and Vitamins (2 gms./lb.).
Percent: PAMBS HCl content in the feed.
Vitamin level: 2 grams per pound of feed.

It will be observed from the results of the tests as set forth in Table III that para-amino-methyl-benzene-sulfonamide-hydrochloride is effective as a growth promoter and accelerates weight gain, increases feed consumption and feed efficiency.

There is shown in Table IV another series of tests with chickens.

*Table IV*

CHICKENS

| Group | No. of birds | Average weight at 4-wk.-old (gm.) | Feed consumption (lb.) | Feed efficiency |
|---|---|---|---|---|
| 15. PAMBS HCl, 0.1% and vitamins | 25 | 556 | 1.95 | 1.73 |
| 16. PAMBS HCl, 0.05% and vitamins | 25 | 556 | 1.99 | 1.76 |
| 17. PAMBS HCl, 0.025% and vitamins | 25 | 550 | 1.95 | 1.75 |
| 18. PAMBS HCl, 0.01% and vitamins | 25 | 558 | 1.98 | 1.74 |
| 19. PAMBS HCl, 0.05% | 25 | 549 | 1.99 | 1.79 |
| 20. Control | 25 | 512 | 1.85 | 1.79 |
| 21. PAMBS HCl, 0.1% and vitamins | 25 | 538 | 1.96 | 1.79 |
| 22. PAMBS HCl, 0.05% and vitamins | 25 | 574 | 2.05 | 1.75 |
| 23. PAMBS HCl, 0.025% and vitamins | 25 | 548 | 1.99 | 1.79 |
| 24. PAMBS HCl, 0.01% and vitamins | 25 | 542 | 2.05 | 1.86 |
| 25. PAMBS HCl, 0.05% | 25 | 553 | 1.98 | 1.76 |
| 26. Control | 25 | 513 | 1.90 | 1.84 |

Percent: PAMBS HCl content in the feed shown in the above Table IV.
Vitamin level: 1 gram per pound of feed as shown.

The chickens in the tests referred to in Table IV were grown from 0 to 4 weeks of age in batteries. Then they were transferred to floor pens covered with litter. Test groups fed PAMBS HCl at 0.05% level plus vitamins (groups 16 and 22) were compared with control groups (groups 20 and 26) which were fed the same basal ration without additive with the following results:

| | PAMBS HCl, 0.05% and vitamins (Groups 16 and 22) | | | Control (Groups 20 and 26) | | |
|---|---|---|---|---|---|---|
| | 4-wk. | 6-wk. | 8-wk. | 4-wk. | 6-wk. | 8-wk. |
| Average weight (pounds) | 1.24 | 2.20 | 3.27 | 1.12 | 1.94 | 3.06 |
| Feed consumption (pounds) | 1.99 | 4.41 | 7.51 | 1.86 | 4.18 | 7.16 |
| Feed efficiency | 1.60 | 2.00 | 2.30 | 1.66 | 2.16 | 2.34 |

It will be noted from the above tests that average weight of groups 16 and 22 was 13+% over the control group at 6 weeks old. It was 7% better than control group at eight weeks old. Feed consumption and feed efficiency were better in PAMBS HCl groups as compared to the control group.

The tests summarized in Table V were conducted with chickens on litter pens from day-old to 7-week-old with a known coccidiostat in the same amount in the feed of each group. Infra-red electric brooders were used. Para-amino-methyl-benzene-sulfonamide-hydrochloride was incorporated as an additive to the feed as shown in the table.

*Table V*

CHICKENS

| Group | No. of birds | Average weight at 4-wk.-old (gm.) | Average weight at 8-wk.-old (gm.) | Feed consumption (lb.) | Feed efficiency |
|---|---|---|---|---|---|
| Control | 125 | 508 | 1,205 | 6.28 | 2.45 |
| PAMBS HCl 0.025% | 125 | 545 | 1,274 | 6.30 | 2.32 |
| PAMBS HCl 0.05% | 125 | 530 | 1,225 | 6.16 | 2.37 |
| Control | 125 | 509 | 1,160 | 6.17 | 2.51 |
| PAMBS HCl 0.025% | 125 | 548 | 1,257 | 6.34 | 2.37 |
| PAMBS HCl 0.05% | 125 | 546 | 1,298 | 6.36 | 2.31 |

Basal ration used in these tests contained protein 21.58%, fat 3.42% and fiber 3.56% and also a coccidiostat. The results showed that groups which included the additive PAMBS HCl had 7% better weight gain than the control groups and also had better feed consumption and better feed efficiency as compared to the control groups.

The following Table VI-A shows the results of tests with turkeys. The tests were conducted in litter pens from day-old to four weeks old. A commercial turkey starter ration was used as the basal diet.

*Table VI–A*

TURKEYS

| Group | No. of birds | Average weight at 4-wk.-old (gm.) | Average weight at 8-wk.-old (gm.) | Feed consumption (lb.) | Feed efficiency |
|---|---|---|---|---|---|
| Control | 50 | 223 | 642 | 2.27 | 1.77 |
| PAMBS HCl 0.025% | 50 | 244 | 714 | 2.34 | 1.62 |
| PAMBS HCl 0.0125% | 50 | 242 | 698 | 2.32 | 1.65 |
| Control | 50 | 238 | 682 | 2.32 | 1.69 |
| PAMBS HCl 0.025% | 50 | 243 | 724 | 2.35 | 1.61 |
| PAMBS HCl 0.0125% | 50 | 239 | 719 | 2.29 | 1.58 |

The results show that the PAMBS HCl treated groups had better weight gains and better feed efficiency at four weeks of age than the control groups (9% for 0.025% and 7% for 0.0125% of PAMBS HCl).

Table VI–B shows the results of tests with 300 Broad Breasted Bronze turkeys divided into three test groups of 100 each. The turkey poults were raised in a brooder house for four weeks and then transferred to pole shed until 16 weeks old. All were raised under like conditions except taht the control group received no PAMBS HCl in their feed; the feed of the other two groups contained PAMBS HCl throughout the 16 week period as indicated in Table VI–B.

In the following tests with chickens (Tables VIII and IX) the amount of additive in each case was at a level which is the equivalent of 0.025% of the base (para-amino-methyl-benzene-sulfonamide) in the feed. The control was the same basal ration as those which contained the additive, but of course, it contained no additive. All groups were otherwise treated under the same conditions in the respective tests.

*Table VI–B*

TURKEYS

| Group | No. birds | 4-wk.-old | | 8-wk.-old | | 12-wk.-old | | 16-wk.-old | |
|---|---|---|---|---|---|---|---|---|---|
| | | Av. wt. (gm.) | Feed effi. | Av. wt. (lb.) | Feed effi. | Av. wt. (lb.) | Feed effi. | Av. wt. (lb.) | Feed effi. |
| Control | 100 | 576 | 1.92 | 4.95 | 1.96 | 9.88 | 2.47 | 16.21 | 2.82 |
| PAMBS HCl 0.0125% | 100 | 641 | 1.72 | 5.20 | 1.94 | 10.69 | 2.34 | 16.66 | 2.75 |
| PAMBS HCl 0.025% | 100 | 644 | 1.72 | 5.07 | 1.91 | 10.41 | 2.35 | 16.75 | 2.68 |

It will be seen that the turkey groups which received the PAMBS HCl showed better weight gain and feed efficiency than the controls throughout the test.

The results of tests with pigs conducted under ordinary and natural farm conditions are shown in Tables VII–A and VII–B. The pigs were confined in separate pens under similar conditions. The tests tabulated in Table VII–A were started when the pigs were 8 weeks of age and terminated 29 days later.

As shown in the above table there was a better weight gain (4.1%) for the PAMBS HCl group as compared to controls. There was a significant improvement in feed efficiency (6.1%) for the PAMBS HCl group.

*Table VII–A*

PIGS

| | No. of pigs | Average initial weight (lb.) | Average final weight (lb.) | Average daily gain (lb.) | Average daily feed intake (lb.) | Feed efficiency |
|---|---|---|---|---|---|---|
| Control | 14 | 37.1 | 208.9 | 1.47 | 5.08 | 3.46 |
| PAMBS HCl 0.025% in feed | 14 | 34.9 | 213.2 | 1.53 | 4.98 | 3.25 |

*Table VII–B*

PIGS

| | No. of pigs | Average initial weight (lb.) | Average final weight (lb.) | Average daily gain (lb.) | Average daily feed intake (lb.) | Feed efficiency |
|---|---|---|---|---|---|---|
| Control | 16 | 23.1 | 36.0 | .45 | 1.63 | 3.65 |
| PAMBS HCl 0.025% in feed | 16 | 24.4 | 43.4 | .66 | 1.94 | 2.95 |

There were highly significant increases in daily weight gain (47.3%) and feed efficiency (19.2%) for the PAMBS HCl group over the controls.

In the foregoing tests it is shown that the hydrochloride salt of para-amino-methyl-benzene-sulfonamide base and also the acid addition salts thereof are effective as additives to the basal animal ration for promoting and accelerating growth. Results of tests with other salts and the base compared with controls to which no additive were included are set forth in the following Tables VIII and IX.

*Table VIII*

CHICKENS

| Group | No. of birds | Average weight at 4-wk.-old (gm.) | Feed consumption per bird (lb.) | Feed efficiency |
|---|---|---|---|---|
| PAMBS Acetate | 25 | 580 | 2.06 | 1.74 |
| PAMBS Arsanilate | 25 | 580 | 2.07 | 1.75 |
| PAMBS Benzoate | 25 | 580 | 2.06 | 1.74 |
| PAMBS Carbarsone | 25 | 573 | 2.07 | 1.77 |
| PAMBS Formate | 25 | 589 | 2.12 | 1.76 |
| Control | 25 | 556 | 2.00 | 1.77 |

*Table IX*

CHICKENS

| Group | No. of birds | Average weight at 4-wk.-old (gm.) | Feed consumption per bird (lb.) | Feed efficiency |
|---|---|---|---|---|
| PAMBS Phenyl-succinate | 25 | 559 | 1.97 | 1.73 |
| PAMBS Propionate | 25 | 588 | 2.11 | 1.76 |
| PAMBS Silicylate | 25 | 565 | 2.02 | 1.75 |
| PAMBS Sulphate | 25 | 571 | 2.04 | 1.75 |
| PAMBS (Base) | 25 | 580 | 2.01 | 1.70 |
| Control | 25 | 538 | 2.06 | 1.89 |

In the following Table X there are shown the results of tests on chickens in which the hydrochloride salt of para-amino-methyl-benzene sulfonamide was administered in the drinking water. The chicks beginning at day-old to four weeks of age were fed a basal ration without any additives. In two groups the hydrochloride salt as indicated was added to the drinking water. In the control group the drinking water did not contain any additive. The tests show that chickens to which the additive was administered by including it in their drinking water showed better weight gain, feed consumption and feed efficiency than the control group.

*Table X*

CHICKENS

| Group | No. of birds | Average weight at 4-wk.-old (gm.) | Feed consumption per bird (lb.) | Feed efficiency |
|---|---|---|---|---|
| Control | 25 | 552 | 2.11 | 1.88 |
| PAMBS Hydrochloride, 0.00625% | 25 | 591 | 2.18 | 1.80 |
| PAMBS Hydrochloride, 0.0125% | 25 | 575 | 2.12 | 1.81 |

PAMBS HCl was used in the water at 0.00625% and 0.0125% levels continuously throughout the test except the controls. Chickens receiving PAMBS HCl in the water showed better weight gain, feed consumption and feed efficiency than the control group. Inasmuch as chickens ordinarily partake of about twice as much water as feed by weight, the concentration of the additive in the drinking water is preferably reduced proportionately.

It has also been discovered that the feed composition provided by this invention is effective not only to accelerate growth when fed to poultry but it is also effective in treating chronic respiratory disease, often commonly referred to as C.R.D., or perhaps more aptly, C.R.D. complex. The cause of C.R.D. complex as it occurs in the field is not clearly defined. Many factors play a part. Mycoplasma gallisepticum, virus infections such as Newcastle disease and infectious bronchitis, E. coli and other organisms are a part of the cause. Therefore treatments for C.R.D. which are aimed only at one causative organism often are of little help.

It has been found that if para-amino-methyl-benzenesulfonamide compounds are incorporated in the feed ration for poultry so that the active part of the compound, namely, the base part, para-amino-methyl-benzene-sulfonamide is present within the range of 0.05 to 0.5%, in solid feed or in the drinking water that the additive has a very favorable effect in treating naturally occurring C.R.D. complex. A number of tests have been conducted with chickens obtained from commercial broiler producers where diagnostic examination showed that the chickens were infected by C.R.D. complex. For purposes of the tests to determine the effectiveness of the compound in treating C.R.D. a large number of chickens from a common source was divided at random into groups of eight each. Each group was fed ad libitum a commercial feed nutritionally adequate for normal growth and there was incorporated in the feed for the different groups an amount of para-amino-methyl-benzene-sulfonamide-hydrochloride (the active ingredient), as shown in the following tables, with results as tabulated therein. The criteria used to judge the efficacy of the chemical compound were weight gains at the end of the test, feed consumption, feed efficiency and tracheal swab bacterial count for organisms found in C.R.D. infected chickens. Results were tabulated at the end of one week and at the end of two weeks after beginning the treatment. Comparison was made with a control group which was fed in the same manner but without the incorporation of the active ingredient.

The following Tables XI and XII show the results of tests conducted with broiler chickens which were at the age at the beginning of the test as shown in the respective tables.

*Table XI*

CHICKENS 7 WEEKS OLD

| Group | No. of birds | Weight gain (percent) | Feed consumption (lb.) | Feed efficiency | Tracheal bact. count | |
|---|---|---|---|---|---|---|
| | | | | | 1-wk. | 2-wk. |
| PAMBS HCl 0.2% Water | 8 | 58 | 3.16 | 2.39 | 95,810 | 73,246 |
| PAMBS HCl 0.5% Feed | 8 | 53 | 3.17 | 2.62 | 67,205 | 102,081 |
| Control | 8 | 52 | 3.21 | 2.72 | 103,043 | 147,509 |
| PAMBS HCl 0.2% Water | 8 | 52 | 2.96 | 2.49 | 100,909 | 53,521 |
| PAMBS HCl 0.5% Feed | 8 | 50 | 2.75 | 2.43 | 118,491 | 103,157 |
| Control | 8 | 48 | 3.14 | 2.88 | 150,985 | 154,776 |

*Table XII*

CHICKENS 6 WEEKS OLD

| Group | No. of birds | Weight gain (percent) | Feed consumption (lb.) | Feed efficiency | Tracheal bact. count | |
|---|---|---|---|---|---|---|
| | | | | | 1-wk. | 2-wk. |
| PAMBS HCl 0.25% Feed | 8 | 91 | 3.89 | 2.39 | 70,059 | 3,910 |
| Control | 8 | 69 | 3.62 | 2.90 | 68,288 | 52,166 |

The following Table XIII shows a summary of results of a large number of tests conducted with chickens. The table is based upon averages in each case of the number of tests shown in the column entitled "No. of Tests." It should be noted that the figures in this column indicate the number of tests and not the number of chickens in the test. The number of chickens in each group in each test is seven or more.

Table XIII
SUMMARY—TESTS WITH CHICKENS

| Group | No. of tests | Av. weight gain (percent) | Feed efficiency | Tracheal bact. count at 2-wk. after treatment |
|---|---|---|---|---|
| PAMBS HCl 0.5% Feed | 4 | 57 | 2.60 | 44,291 |
| Control | 4 | 52 | 2.92 | 69,042 |
| PAMBS HCl 0.25% Feed | 7 | 56 | 2.54 | 47,200 |
| Control | 7 | 48 | 2.90 | 97,061 |
| PAMBS HCl 0.1% Feed | 7 | 60 | 2.69 | 122,834 |
| Control | 7 | 51 | 2.90 | 139,411 |
| PAMBS HCl 0.05% Feed | 2 | 65 | 2.46 | 193,984 |
| Control | 2 | 59 | 2.72 | 275,544 |
| PAMBS HCl 0.2% Water | 3 | 58 | 2.71 | 35,426 |
| Control | 3 | 57 | 2.84 | 78,514 |
| PAMBS HCl 0.1% Water | 2 | 66 | 2.71 | 80,094 |
| Control | 2 | 56 | 3.02 | 121,616 |
| PAMBS HCl 0.075% Water | 2 | 68 | 2.41 | 170,408 |
| Control | 2 | 59 | 2.72 | 275,544 |

It will be observed from the foregoing that para-amino-methyl-benzene-sulfonamide and its salts are effective as an additive to the normal diet of animals in obtaining accelerated growth or weight gain, better feed consumption, better feed efficiency and lower bacterial count with respect to C.R.D. in poultry than is obtained by the normal diet without such additive.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A feed composition for promoting the growth of swine which comprises a mixture of a feed nutritionally adequate per se for normal growth of the swine and 0.005% to 0.5% of a compound selected from the class consisting of para-amino-methyl-benzene-sulfonamide and the salts thereof.

2. A feed composition according to claim 1 in which the mixture contains about 0.025% of the compound selected from the class consisting of para-amino-methyl-benzene-sulfonamide and the salts thereof.

3. A feed composition for promoting the growth of poultry which comprises a mixture of a feed nutritionally adequate per se for normal growth of the poultry and 0.005% to 0.5% of a compound selected from the class consisting of para-amino-methyl-benzene-sulfonamide and the salts thereof.

4. A feed composition according to claim 3 in which the mixture contains about 0.025% of the compound selected from the class consisting of para-amino-methyl-benzene-sulfonamide and the salts thereof.

5. A method of accelerating growth of swine which comprises feeding the swine ad libitum rations supplying an effective but non-toxic amount for growth promotion of a compound selected from the class consisting of para-amino-methyl-benzene-sulfonamide and the salts thereof.

6. A method of accelerating growth of swine which comprises feeding to the swine ad libitum a mixture of feedstuff nutritionally adequate per se for normal growth of the animals and 0.001% to 0.5% of a compound selected from the class consisting of para-amino-methyl-benzene-sulfonamide and the salts thereof.

7. A method according to claim 6 in which the mixture contains about 0.025% of the compound selected from the class consisting of para-amino-methyl-benzene-sulfonamide and the salts thereof.

8. A method of accelerating growth of poultry which comprises feeding the poultry ad libitum rations supplying an effective but non-toxic amount for growth promotion of a compound selected from the class consisting of para-amino-methyl-benzene-sulfonamide and the salts thereof.

9. A method of accelerating growth of poultry which comprises feeding to the poultry ad libitum a mixture of feedstuff nutritionally adequate per se for normal growth of the animals and 0.001% to 0.5% of a compound selected from the class consisting of para-amino-methyl-benzene-sulfonamide and the salts thereof.

10. A method according to claim 9 in which the mixture contains about 0.025% of the compound selected from the class consisting of para-amino-methyl-benzene-sulfonamide and the salts thereof.

11. A method of accelerating growth and simultaneously treating poultry infected with the organisms which cause the disease known as C.R.D. complex which comprises feeding ad libitum to the infected birds an amount of a compound selected from the class consisting of para-amino-methyl-benzene-sulfonamide and the salts thereof sufficient to provide adequate non-toxic dosage to effectively attack the organisms in the bodies of said birds which are the causitive agents of said disease together with a feed ration nutritionally adequate per se for normal growth of said birds.

12. A method of accelerating growth and simultaneously treating poultry infected with the organisms which cause the disease known as C.R.D. complex which comprises feeding ad libitum to the infected birds a feed composition comprising a mixture of poultry feed adequate per se for normal growth of the poultry and 0.001% to 0.5% of a compound selected from the class consisting of para-amino-methyl-benzene-sulfonamide and the salts thereof.

References Cited by the Examiner

Hawking, The Sulphon-amides, 1950, Lewis and Co., London, England, pages 128, 129, 304 and 305.

U.S. Dispensatory—25th edition, 1955, Lippincott Co., Philadelphia, Pa., pages 1990 and 1991.

JULIAN S. LEVITT, *Primary Examiner.*

FRANK CACCIAPAGLIA, JR., LEWIS GOTTS,
*Examiners.*